Sept. 2, 1924.

R. M. LOVEJOY 1,506,846

HYDRAULIC CLUTCH

Filed Nov. 5, 1919  3 Sheets-Sheet 1

Inventor.
Ralph M. Lovejoy
by Heard Smith & Tennant
Attys.

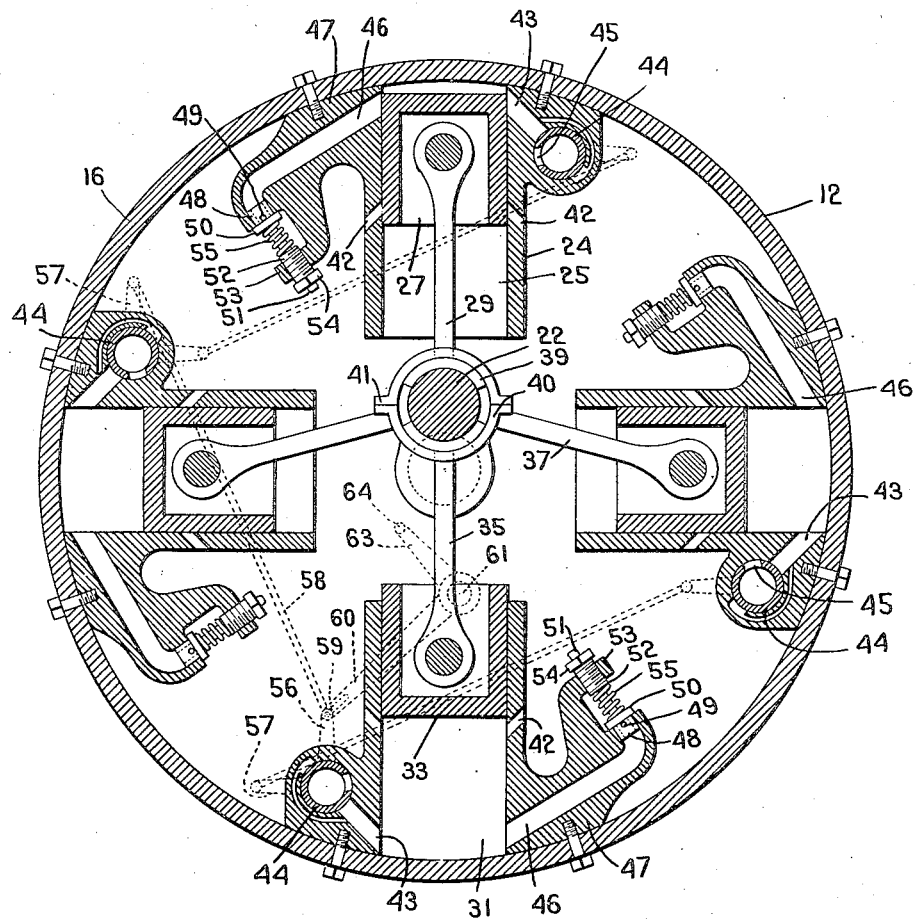

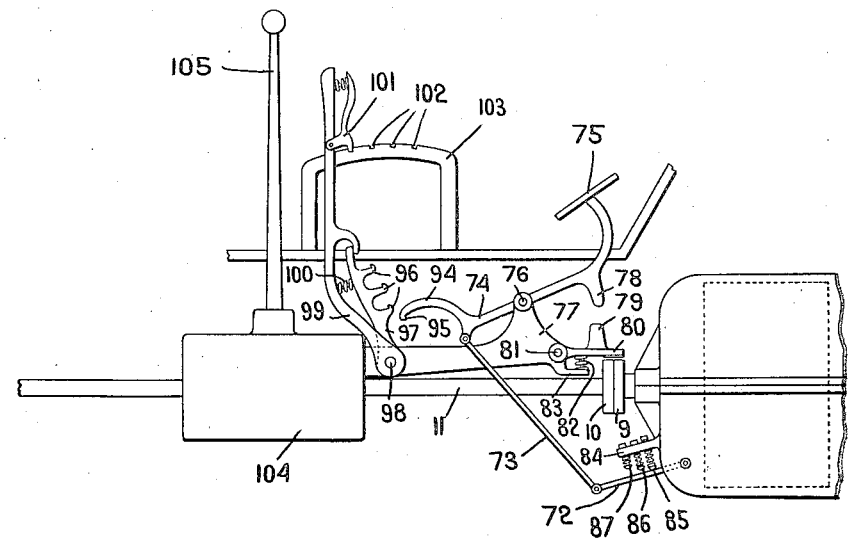
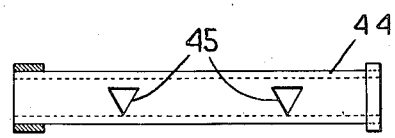
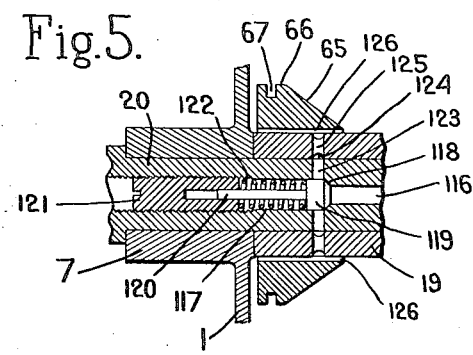

Patented Sept. 2, 1924.

1,506,846

UNITED STATES PATENT OFFICE.

RALPH M. LOVEJOY, OF MEREDITH, NEW HAMPSHIRE.

HYDRAULIC CLUTCH.

Application filed November 5, 1919. Serial No. 335,909.

*To all whom it may concern:*

Be it known that I, RALPH M. LOVEJOY, a citizen of the United States, and resident of Meredith, county of Belknap, State of New Hampshire, have invented an Improvement in Hydraulic Clutches, of which the following description, in connection with the accompanying drawing, is a specification, like characters on the drawing representing like parts.

This invention relates to improvements in hydraulic clutches for transmitting the rotation of one rotatable member to another relatively rotatable member, and the object thereof is to provide a simple and effective clutch by means of which substantially the whole power of the rotatable driving member may be transmitted to the driven member, or such a "slippage" between said members transmitted as to enable the driven member to be rotated at a greatly reduced speed or to remain stationary during the rotation of the driving member.

A further object of the invention is to provide a hydraulic clutch with a novel controlling mechanism by which the amount of power transmitted from the rotary driving member to the rotary driven member may be accurately regulated.

Another object of the invention is to provide a hydraulic clutch comprising two relatively rotatable members having a cylinder connected to one and a piston to the other with means for supplying fluid to said cylinder with a novel means for restricting the expulsion of fluid from said cylinder.

A further feature of the invention consists in providing a novel form of relief valve for said cylinder which will be operated under excessive pressure of the piston in said cylinder thereby preventing rupture or injury to the parts of the clutch.

A further object of the invention is to provide a clutch for two relatively rotatable members comprising a drum or fly wheel connected to one of said members having a plurality of radially arranged oppositely disposed internal cylinders providing pistons connected by piston rods to a crank shaft upon the other rotatable member.

A further object of the invention is to provide a hydraulic clutch comprising a fly wheel or drum connected to one of the rotatable members with a plurality of pairs of cylinders having pistons reciprocable therein, said pistons being connected to a crank shaft upon the other rotatable member in such a manner that the pistons of each pair will move simultaneously in opposite directions thereby maintaining a proper balance of the fly wheel or drum.

Another object of the invention is to provide means for maintaining a constant supply of oil to a hydraulic clutch mechanism of the character specified.

A further object of the invention is to provide the means for supplying oil to the hydraulic clutch mechanism with means for lubricating the bearings of the driving and driven shafts.

A further feature of the invention consists in supplying a hydraulic clutch mechanism with oil from the same source as that which supplies the oiling system of an engine, and further in utilizing the same fluid circulating device for maintaining a circulation of oil through the oiling system of the engine and the hydraulic clutch mechanism.

A further and important object of the invention is to provide a hydraulic clutch mechanism for automobiles which may be so controlled as to enable the automobile to be driven at any desirable speed without requiring the shifting of gears as is commonly necessitated by the usual automobile construction.

Other objects and features of the invention will appear more fully from the following description and accompanying drawings and will be pointed out in the annexed claims.

A preferred embodiment of the invention is illustrated in the accompanying drawing as applied to the driving mechanism of an automobile.

In the drawings:—

Fig. 2 is a transverse sectional view taken axially through one of the sets of cylinders.

Fig. 3 is a diagrammatic view illustrating the hydraulic clutch embodying my invention, and the controlling means therefor as applied to an automobile driving mechanism.

Fig. 4 is a detail view of one of the tubular valves for controlling the discharge ports of the cylinders of the clutch.

Fig. 5 is a detail vertical central sectional view of the driven shaft and associated parts showing the valve for restricting the flow of liquid from the clutch.

Figure 1:
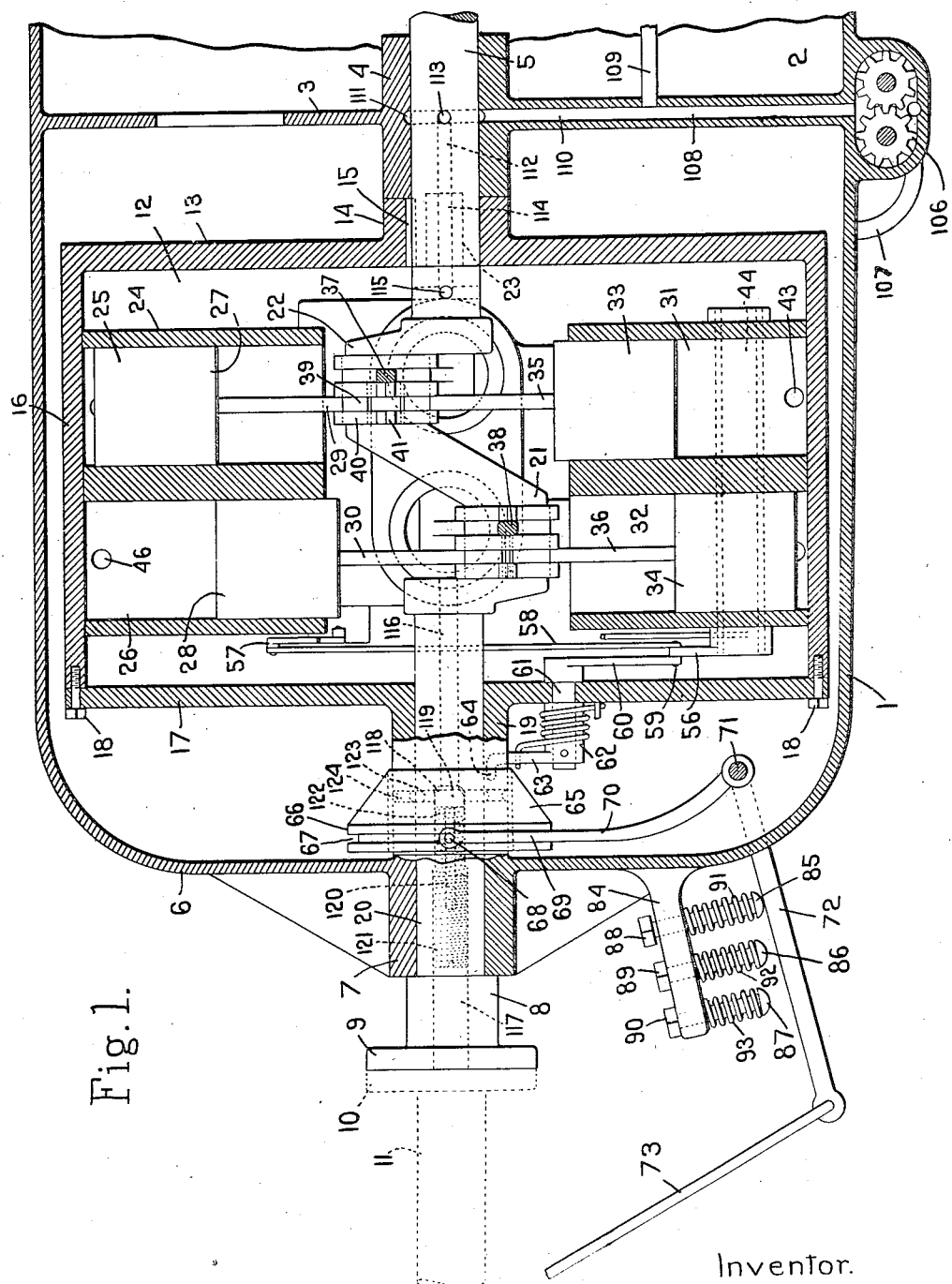
Fig. 1 is a longitudinal vertical sectional view of a preferred form of hydraulic clutch embodying my invention illustrated as coupling the main driving shaft of an engine to a driven shaft such as the main shaft of an automobile.

As illustrated in the accompanying drawings the hydraulic clutch forming the subject matter of my invention may be and is enclosed within a casing 1 which may be conveniently made as an integral extension of the usual crank case 2 of an engine. The casing 1 desirably is provided at one end with a wall or spider 3 having at its center a bearing 4 for the usual crank shaft 5 of the engine. At its opposite end the casing may likewise be provided with a head 6 having a central boss providing a bearing 7 for the usual driven shaft 8 which is provided with a flange 9 adapted to be connected by suitable bolts to the flange 10 of a shaft 11 from which the power may be applied in any desirable manner as to the rear wheels of an automobile.

As illustrated in the accompanying drawings a drum 12 is positively connected to the end of the engine crank shaft 5 and may conveniently be utilized as the fly wheel which ordinarily maintains the uniform speed of rotation of the crank shaft which is a part of the engine. As is illustrated herein, the drum 12 is provided with a head 13 having a central boss 14 which is fixedly secured to the engine crank shaft 5 by a key 15. The drum preferably has a cylindrical wall 16 to the opposite end of which the head 17 is secured by suitable bolts 18. The head 17 of the drum is provided with a central boss 19 which is rotatably mounted upon the portion 20 of the driven shaft 8 which extends through the bearing 7 in the end of the casing 1. The driven shaft 8 is provided centrally of the drum with one or preferably a plurality of cranks 21 and 22 and at its opposite end is provided with an axial reduced portion 23 which is seated in a corresponding aperture or socket in the end of the engine crank shaft 5.

Relative rotation is imparted from the crank shaft 5 to the driven shaft 11 through the medium of one or more cylinders carried by the drum having pistons connected to the crank or cranks of the driven shaft, means being provided for introducing fluid into said cylinder or cylinders and for controlling the rate of expulsion of the fluid from said cylinder or cylinders.

In the present embodiment of the invention the cylinders are illustrated as being carried by the drum and the pistons connected to the cranks of the driven shaft, but it is obvious that the relative arrangements may be reversed, without departing from the spirit and scope of my invention.

My invention comprises broadly therefore providing a cylinder and piston coupling between the driving and driven members with means for introducing fluid into said cylinder and controlling the expulsion thereof from said cylinder.

If fluid is introduced into the cylinder or cylinders and prevented from escaping therefrom there can be no movement of the piston in the cylinder, consequently the rotatable members will be effectively locked together and will rotate in unison. If a discharge of fluid from the cylinder or cylinders is permitted to take place the pistons will reciprocate under the influence of the load upon the driven shaft so that there will be a relative rotation between the shafts which corresponds to the slippage of the usual frictional clutch mechanisms.

By providing means for accurately controlling the discharge of the fluid from the cylinders therefore the effective operation of the clutch may be maintained through a wide range of adjustment. As a matter of fact the regulation of the expulsion of fluid may be so controlled that the driving and driven members will be rotated in unison upon one hand, or upon the other hand one of said members may be permitted to rotate while the other member will remain stationary, the fluid in such instances being permitted to flow freely through the discharge port or ports in the cylinder or cylinders.

As is illustrated in the accompanying drawings a plurality of cylinders and pistons are employed. The cylinders desirably comprise a casting 24 fixedly secured to the interior of the periphery of the drum 16 and present two parallel cylinders 25, 26 which are radially arranged and are provided respectively with pistons 27 and 28 which are connected by piston rods 29 and 30 to the cranks 22 and 21 respectively.

The cranks 21 and 22 of the driven shaft 8 are arranged at an angle of 180 degrees to each other so that the pistons 27 28 will move in opposite directions. Another pa'r of cylinders 31 32 are diametrically oppositely disposed to the cylinders 25 26 respectively and are provided with pistons 33 and 34 which are connected respectively by piston rods 35 and 36 to the cranks 22 and 21. Other pairs of cylinders of l'ke kind may also be radially arranged within the drum 12 with their axes at right angles to the axes of the cylinders 25, 26, 31 and 32 and may be similarly arranged in pairs. These cylinders may likewise be connected by piston rods 37 and 38 to the cranks 22 and 21 respectively as illustrated in Fig. 2 of the drawings. The piston rods of opposite pairs of pistons desirably are connected to their cranks in the same planes, and to accomplish this purpose the inner end of each piston rod is provided with a flanged sector 39 which extends a portion of the d'stance around the crank. The sectors of the diametrically opposite piston rods are secured to the crank by split rings 40 which have flanges 41 fastened together by bolts or any other suitable fastener. The ends of the sectors 39 of the oppositely disposed piston rods are spaced apart sufficiently to permit the lateral movement required during the rotation of the crank.

It will be obvious that by reason of this construction a balance will always be maintained in the drum or fly wheel which will insure the smooth transmission of a rotary motion from the driving shaft to the driven shaft.

The drum or fly wheel is maintained filled with oil and suitable means are provided for permitting the oil to flow freely into the cylinders when the pistons are withdrawn toward the center of the drum. To accomplish this purpose one or more ports 42 are provided through the walls of the cylinders at or a short distance below the limit of the inward movement of the piston. In order to restrict the expulsion of the fluid from the cylinders the exhaust ports 43 are provided with adjustable valves which preferably are in the form of hollow tubes 44 having V shaped slots 45 in their sides adapted to communicate with the ports 43, the fluid entering the tubular valves 44 through said ports being discharged through the open end or ends of the said tubular valves. By providing suitable means for controlling the area of the valve opening 45 presented to the port 43, the rate of expulsion of the fluid from the cylinders may be so regulated that any desired slippage may be provided, or so rotating the valves 44 as to close the ports 43 entirely, a practically rigid connection may be established between the cranks of the crank shaft, and the drum or fly wheel so that the driving and driven shafts will be caused to rotate in unison. The valves 44 for all of the cylinders desirably are so connected as to be simultaneously opened and closed to the same amount so that the action of all of the cylinders upon the cranks will be the same.

In order to provide against rupture of the cylinders or drum or other injury thereto relief ports 46 are provided which extend through bosses 47 projecting laterally from the respective cylinders. The outlets of the ports 46 are preferably controlled by unbalanced spring pressed valves, the tension of the springs of such valves being adjustable.

The preferred form of relief valve which is disclosed herein comprises a tubular member 48 telescopically arranged in the outlet of the port 46 and having a lateral port 49. The valve 48 is provided with a solid head 50 of larger diameter than the opening of the port 46 and seats upon the boss in such a manner as to normally close said opening against the expulsion of said fluid.

The head 50 of the valve 48 is provided with a stem 51 which extends into a guideway in a member 52 which is screwed into a lateral extension 53 of the boss 47 and is provided with an angular head 54 by means of which it may be rotated. A spring 55 surrounding the valve stem 51 is seated at one end against the head 50 of the valve and at its opposite end against the member 52 thereby normally holding the valve seated. When the fluid in the cylinder is subjected to such an excessive pressure that the fluid cannot be forced through the port 45 of the tubular valve 44, it will force the valve 48 upwardly against the pressure of the spring 55 until the port 49 of said valve lies beyond the end of the outlet of the port 46 whereupon the fluid can flow from the cylinder into the drum. Thus the likelihood of injury to the clutch members is avoided and the danger of breakage due to the sudden starting and stopping of the engine eliminated.

The rotary valves for the various cylinders may be connected or coordinated in any suitable manner. As illustrated herein the tubular valve 44 is of sufficient length to extend across both cylinders of each pair and the V shaped valve ports 45 are so arranged as simultaneously to communicate with both cylinders of a pair. The tubular valves are provided with one or more arms 56 and 57, preferably extending at right angles to each other. The arm 56 of one of said valves is connected by a link 58 to the arm 57 of the valve 44 of the next adjacent cylinder so that all of the tubular valves may be rocked simultaneously.

Any suitable means may be provided for thus actuating the valves. As disclosed herein one of the arms 56 has a pin and slot connection 59 to an arm 60 of a rock shaft 61 which is journalled in the head 17 of the drum 16 and extends a distance through it. A sleeve 62 secured to the rock shaft 61 is provided with an arm 63 having a laterally extending end 64 which is held by a spring against the conical surface 65 of a cone 66 which is slidably mounted upon the portion 19 of the drum 12. The cone 66 is provided with a cylindrical base portion having a peripheral slot 67 which receives trunnions 68 carried by the ends of the arms 69 of the yoke shaped member 70 of a bell crank lever which is pivoted upon a shaft or stud 71 extending transversely of the casing 1. The other arm 72 of said bell crank lever is connected by a link 73 to suitable actuating mechanism such as the clutch pedal of an automobile. As illustrated in Fig. 3 the link 73 is connected to the lower arm 74 of a clutch pedal 75 which is pivotally mounted upon a stud 76 carried by a bracket 77 which is supported from the main frame of the machine. The pedal 75 is provided with a downward projection 78 which is adapted to engage a stop 79 carried by the bracket 77 to limit the downward movement of the clutch pedal 75. The valves are so arranged that when the clutch pedal is depressed to its fullest extent and the projection 78 engages the stop 79 the valve ports 45 will be fully opened and the fluid in the cylinders permitted to pass freely from said cylinders into the drum. When the pedal is in this position the clutch is rendered completely inoperative and the driving member is free to rotate independently of the driven member. As the clutch pedal is permitted to raise the valve ports 45 will be so moved as greatly to restrict the area of the ports 43 and thereby gradually increase the resistance to the flow of fluid through the discharge ports 43 of the cylinders, thus making the clutch effective.

In order to stop any rotation of the driven shaft after the ports 45 are widely opened, the stop member 79 desirably is carried by an arm 80 which is pivotally mounted upon a stud 81 on the bracket 77, the end of the arm 80 being placed immediately above and nearly in contact with the cylindrical peripheries of the coupling members 9 and 10 which unite the shafts 8 and 11. A spring 82 carried upon a projection 83 of the bracket 77 and engaging the under side of the arm 80 normally tends to retain the arm 80 out of engagement with the cylindrical peripheries of the couplings 9 and 10. When, however, the pedal lever is depressed to its fullest extent the arm 80 is forced into engagement with said cylindrical peripheries and serves as a brake to stop the rotation of the shafts.

In order to provide definite valve openings which establish an action of the clutch corresponding to the definite ratios of gears usually employed in automobiles, spring pressed stops are provided for engaging the arm 72 of the bell crank which controls the operation of the valves. As illustrated herein three of such spring pressed stops are employed and are carried by a bracket 84 which projects from the wall of the casing 1. These stops 85 and 86 and 87 are of different lengths and are provided with heads which are adapted to engage the arm 72 of the bell crank lever, and are slidably mounted in journals in the bracket 84, the outer ends of said stops being provided with nuts 88, 89 and 90 by which their positions may be limited. The stops 85, 86 and 87 are actuated by helical springs 91, 92, and 93 respectively and serve to engage the arm 72 of the lever when the valves are in definite positions.

As shown, the stop 85 engages the arm 72 of the bell crank lever when the valves are fully closed, and the drum and the driven shaft effectively locked to rotate in unison. By depressing the pedal the operator may open the valves gradually thereby creating a slippage in the clutch which will permit the driving shaft to rotate at a greater speed than the driven shaft in accordance with the amount to which the valves are opened, so that any driving relation may be established between the driving and driven shafts. The successive stops 86 and 87 when engaged by the arm 72 warn the operator as to the amount to which the valves 44 are opened and when the pedal is fully depressed and all springs engaged by the arm 72 the operator is advised that the valves are fully opened and the clutch running idly.

It is desirable in running an automobile, and under other conditions that the valve actuating mechanism for the clutch may be locked in such position as to maintain a predetermined driving action between the driving and driven shafts. I have therefore provided means whereby the pedal which controls the valve may be secured at predetermined points. A convenient mechanism which is illustrated herein comprises an extension of the member 94 which desirably has a hook shaped end 95 adapted to engage any one of a series of hooks 96 carried by a latch 97 which desirably is pivotally mounted upon the shaft 98 secured to the bracket 77. A lever 99 also is pivoted upon or secured to the shaft 98 and has a spring 100 secured to it which bears against the latch 97 and normally tends to force the hooks 96 toward the hook 95 of the pedal extension 94. The lever 99 is provided at its upper end with a keeper 101 which may be set in any one of a series of notches 102 in a bracket 103 carried by the main frame of the automobile. When it is desired to run the car at a certain speed or to lock the clutch in such position that it will not drive the driven shaft, the pedal is forced downward to the desired position, the lever swung forward until one of the hooks 96 engages the hook 95 to lock the pedal in the predetermined position. If desired the usual form of transmission comprising gears of different diameters and a reverse may be introduced between sections of the shaft 11 and a usual form of box 104 for such transmission is diagrammatically illustrated herein together with a lever 105 for shifting gears.

It is desirable, if not essential, that the drum 12 shall be continuously maintained filled with oil or such other fluid as is used for the hydraulic clutch. In the present construction means are provided for continuously pumping oil from the crank case into the drum of the hydraulic clutch and also for utilizing the same pumping means for maintaining the circulation of oil through the engine.

As before stated the casing 1 of the hydraulic clutch desirably is connected to the crank case 2 of the engine or formed integral therewith. In any event it desirably communicates directly with the crank case 2 so that the chamber formed in the casing 1 is in effect a continuation of the crank case. The crank case therefore, and the casing which communicates therewith receives a sufficient supply of oil to maintain the lubrication of the engine and for the purposes of the hydraulic clutch.

The circulation of oil is established by means of a pump which as disclosed herein is a rotary pump 106 which is supplied through an inlet 107 from the crank case or the casing of the hydraulic clutch and which expels the fluid through a conduit 108 having a branch 109 which forms part of the usual lubricating system of the engine and a section 110 which leads to a groove 111 in the bearing 4 for the engine shaft 5. The end of the shaft 5 is provided with an axial duct 112 which connects with the groove 111 through one or more ports 113 extending radially outward from the duct 112. At its opposite end the duct 112 communicates with a duct 114 in the extension 23 of the driven shaft, the duct 114 having a port 115 extending radially of said shaft and discharging into the drum 12.

The section 20 of the shaft 8 which merges into the crank 21 is provided with an axial duct 116 which leads through the bearing 19 to the end of the drum and merges into a larger axial aperture 117 extending from the opposite end of the shaft 8 toward said drum. The junction between the duct 116 and the enlarged aperture 117 provides a valve seat 118 which is engaged by a spring pressed valve 119 having a stem 120 slidably mounted in a way formed axially in a screw threaded stud 121 which is adjustably secured in said enlarged aperture 117. A spring 122 surrounding the stem 120 of the valve 119 provides means for yieldably holding the valve 119 in its seat and the pressure of the spring may be varied by adjusting the screw threaded plug 121. Radial ports 123 leading from the enlarged portion 117 of the aperture in the shaft 20 discharge the oil from the duct 116 into a groove 124 in the hub 19 of the drum head 17, and ports 125 leading from said groove to ducts 126 extending longitudinally along the inner wall of the cone 66 provide lubrication for the hub 19 and the discharge of oil through the ducts 125 also lubricates the bearing 7 for the section 20 of the shaft 8. Thus the oil which is taken from the crank case of the engine or from the casing 1 of the hydraulic clutch is forced by the pump both through the lubricating system of the engine and through the bearings of the driving and driven shafts, and the drum is at all times maintained full of oil. The pressure required by the pump to circulate the oil through the drum is controlled by the adjustment of the valve 119, and by increasing the pressure required to force the oil by the valve 119 any desired pressure may be maintained within the drum. By regulating the pressure maintained within the drum the rapidity with which it will be forced into the cylinders may be varied.

It will be noted that the arrangements of the ports 42 in the cylinders is such that the centrifugal force imparted to the oil by the rotation of the drum will tend to force the oil outwardly through the inclined ports into the cylinders, thereby facilitating the filling of the cylinders quickly when the pistons are moved inwardly sufficiently to open the ports.

In usual clutch constructions considerable momentum is transmitted to the driven shaft after the clutch is released by reason of the weight and centrifugal force of the clutch member which co-operates with the member upon the driving shaft. In the present construction no such momentum has to be overcome during the stoppage of the driving shaft since the driven shaft comprises merely the rotating cranks 21, 22 which are relatively close to the axis of the shaft and the pistons 27, 28 and 33, 34 which are in pairs moving in opposite directions and which under the influence of centrifugal force will balance each other. Therefore a much easier stopping of the driven shaft will be accomplished. Conversely it is unnecessary to create the momentum necessary in the starting of the usual clutch, hence both the stopping and starting of the present clutch is smoother and requires less energy.

The continuous circulation of oil from the casing through the hydraulic clutch prevents the undue heating of the oil within the clutch, which otherwise might result from the compression and forced circulation thereof through the ports in the cylinder. If desired a radiator or other cooling means may be provided for further reducing the temperature of the oil circulated through the clutch and lubricating system.

It will be understood that the embodiment of the invention disclosed herein is of an illustrative character and is not restrictive and that various modifications of construction may be made within the spirit and scope of the following claims.

Having thus described my invention what I claim as new and desire to secure by Letters Patent is—

1. A hydraulic clutch comprising a rotatable driving member and a rotatable driven member, one of which constitutes a liquid containing drum, two pairs of diametrically oppositely disposed cylinders connected to said drum and co-operating pairs of pistons connected to the other member, the pistons of each pair being so disposed as to move in opposite directions, means controlled by said pistons for supplying the liquid to said cylinders by centrifugal force and means for regulating the expulsion of fluid from said cylinders to said drum.

2. A hydraulic clutch for two relatively rotatable members one of which comprises a fluid containing drum having a plurality of radially arranged oppositely disposed internal cylinders with pistons reciprocable therein, and the other member comprises a shaft having a crank, a piston rod connecting said crank to each piston, each cylinder having an outwardly inclined open inlet port permitting fluid to flow freely under the influence of centrifugal force from said drum into said cylinder when the piston approaches the limit of its movement in one direction, and a discharge port and means for regulating the area of said discharge port whereby the flow of fluid therethrough may be restricted.

3. A hydraulic clutch for two relatively rotatable members one of which comprises a fluid containing drum having a plurality of radially arranged oppositely disposed internal cylinders with pistons reciprocable therein and the other member comprises a shaft having a crank, a piston rod connecting said crank to each piston, each cylinder having an outwardly inclined inlet port adapted normally to be closed by said piston, but adapted to be opened when the piston approaches the limit of its inward movement to permit the fluid to flow from said drum into said cylinder under the influence of centrifugal force, a discharge port for said cylinder and means for regulating the area of said discharge port whereby the flow of fluid therethrough may be restricted, means for maintaining said drum constantly filled with fluid under pressure and means for regulating the pressure of the fluid within said drum.

4. A hydraulic clutch for two relatively rotatable members one of which comprises a fluid containing drum having a plurality of radially arranged oppositely disposed internal cylinders with pistons reciprocable therein, and the other member comprises a shaft having a crank, a piston rod connecting said crank to each piston, each cylinder having an inlet port permitting fluid to flow from said drum into said cylinder when the piston approaches the limit of its movement in one direction, a discharge port and means for regulating the area of said discharge port whereby the flow of fluid therethrough may be restricted, means for introducing fluid into said drum axially through one of said members, and means for discharging the fluid from said drum axially through the other member.

5. A hydraulic clutch for two relatively rotatable members one of which comprises a fluid containing drum having a plurality of radially arranged oppositely disposed internal cylinders with pistons reciprocable therein, and the other member comprises a shaft having a crank, a piston rod connecting said crank to each piston, each cylinder having an inlet port permitting the fluid to flow from said drum into said cylinder when the piston approaches the limit of its movement in one direction, a discharge port and means for regulating the area of said discharge port whereby the flow of fluid therethrough may be restricted, means for introducing fluid into said drum axially through one of said members, means for discharging the fluid from said drum axially through the other member, and an adjustable spring actuated valve operable to restrict the discharge of fluid through said member.

6. A hydraulic clutch for two relatively rotatable members one of which comprises a cylindrical liquid containing drum having a pair of juxtaposed radial cylinders, a diametrically oppositely disposed pair of juxtaposed cylinders, pistons reciprocable in said cylinders, and the other member comprises cranks having piston rods connected to said pistons, said cranks being so disposed that the pistons of each pair of juxtaposed cylinders move in opposite directions thereby maintaining a balance of said drum, said cylinders having inlet ports controlled by their respective pistons permitting liquid to flow from said drum into said cylinders, discharge ports, valves for controlling the expulsion of liquid through said discharge ports into said drum, and means for regulating said valves.

7. A hydraulic clutch for two relatively rotatable members one of which comprises a cylindrical liquid containing drum having a plurality of pairs of juxtaposed radial cylinders diametrically oppositely arranged having pistons reciprocable therein, and the other member comprises cranks having piston rods connected to said pistons, said cranks being so disposed that the pistons of each pair move in opposite directions thereby maintaining a balance of said drum, said cylinders having inlet ports controlled by their respective pistons permitting liquid to flow from said drum into said cylinders, discharge ports, valves for controlling the expulsion of liquid through said discharge ports into said drum, and means for simultaneously regulating the valves for the discharge ports of all of said cylinders.

8. A hydraulic clutch for two relatively rotatable members one of which comprises a cylindrical liquid containing drum having a plurality of pairs of juxtaposed radial cylinders diametrically oppositely arranged having pistons reciprocable therein, and the other member comprises cranks having piston rods connected to said pistons, said cranks being so disposed that the pistons of each pair move in opposite directions thereby maintaining a balance of said drum, said cylinders having inlet ports controlled by their respective pistons permitting liquid to flow from said drum into said cylinders, discharge ports, tubular valves for said discharge ports, and means for simultaneously rotarily adjusting said tubular valves.

9. A hydraulic clutch for two relatively rotatable members one of which comprises a cylindrical fluid containing drum having a plurality of pairs of radially arranged oppositely disposed cylinders having pistons reciprocable therein, and the other member comprises cranks having piston rods connected to said pistons, said cranks being so disposed that the pistons of each pair move in opposite directions thereby maintaining a balance of said drum, said cylinders having inlet ports permitting fluid to flow from said drum into said cylinders, discharge ports, tubular valves for said discharge ports, and means for simultaneously rotarily adjusting said tubular valves including a rock shaft mounted in the head of said drum, an arm within said drum connected to said rock shaft and to said valves, an arm connected to said rock shaft outside of said drum, and means for actuating said outside rock shaft arm.

10. A hydraulic clutch for two relatively rotatable members one of which comprises a cylindrical fluid containing drum having a plurality of pairs of radially arranged oppositely disposed cylinders having pistons reciprocable therein, and the other member comprises cranks having piston rods connected to said pistons, said cranks being so disposed that the pistons of each pair move in opposite directions thereby maintaining a balance of said drum, said cylinders having inlet ports permitting fluid to flow from said drum into said cylinders, discharge ports, tubular valves for said discharge ports, and means for simultaneously rotarily adjusting said tubular valves including a rock shaft mounted in the head of said drum, an arm within said drum connected to said rock shaft and to said valves, an arm connected to said rock shaft outside of said drum, and means for actuating said outside rock shaft arm including a cone slidably mounted upon one of said rotatable members having its conical face engaging said outside rock shaft.

11. In combination with an engine having a crank shaft and provided with a lubricating system, a driven shaft in axial alinement with said engine crank shaft, a hydraulic clutch operable to transmit rotation from said engine crank shaft to said driven shaft, a casing for said clutch having bearings for said engine crank shaft and said driven shaft, and means for forcing oil through said lubricating system, the bearings of said casing, and said clutch, and acting to maintain said hydraulic clutch filled with oil.

12. In combination with an engine having a crank shaft, a crank case and oiling system for the engine, a hydraulic clutch comprising a closed drum on said crank shaft having a plurality of radially arranged diametrically oppositely disposed cylinders, a driven shaft mounted axially in said drum having piston rods connecting the cranks of said driven shaft to said pistons, inlet and discharge ports in said cylinders, means for controlling said discharge ports, ducts extending axially of said shafts having branches leading to the bearings of said shafts, and means for causing the circulation of fluid from said crank case through said oiling system and through the ducts of said shaft.

13. A hydraulic clutch comprising a rotatable driving member and a rotatable driven member, a cylinder connected to one of said members, and a cooperating piston connected to the other member, means for supplying a fluid to said cylinder, and means for regulating the expulsion of fluid from said cylinder including a valve, a lever for actuating said valve, springs positioned to act successively upon said lever when the valve is opened predetermined distances, and manually operable means for actuating said lever against the action of the successive springs.

14. A hydraulic clutch comprising a rotatable driving member and a rotatable driven member, a cylinder connected to one of said members, and a cooperating piston connected to the other member, means for supplying a fluid to said cylinder, and means for regulating the expulsion of fluid from said cylinder including a valve, a lever for actuating said valve, springs positioned to act successively and cumulatively upon said lever as said valve is progressively opened predetermined distances, and manually operable means for actuating said lever against the action of the successive springs, and means for locking said lever in adjusted position whereby predetermined effective operations of the clutch may be maintained.

15. In combination with two relatively rotatable members a hydraulic clutch and means for operating the same to transmit motion from one of said members to the other, a pump operable to force liquid under pressure into said hydraulic clutch during its rotation and means for regulating the expulsion of the liquid from the clutch whereby the pressure of the fluid within said clutch may be controlled.

16. In combination with two relatively rotatable members a hydraulic clutch and means for actuating the same to transmit motion of one of said members to the other, means for forcing fluid under pressure into said hydraulic clutch during its rotation, and means for automatically regulating the pressure of said fluid to a predetermined amount.

17. In combination with two relatively rotatable members a hydraulic clutch and means for actuating the same to transmit motion of one of said members to the other, means for forcing fluid under pressure into said hydraulic clutch during its rotation, and means for automatically regulating the pressure of said fluid to a predetermined amount, including a valve adapted automatically to discharge fluid from said hydraulic clutch when a predetermined pressure has been reached.

18. In combination with an engine provided with a lubricating system and driving shaft actuated by said engine, a driven shaft, and a hydraulic clutch operable to transmit motion from said driving to said driven shaft, means for supplying oil to said lubricating system and to said hydraulic clutch continuously during the operation of the engine.

19. In combination with an engine provided with a lubricating system and driving shaft actuated by said engine, a driven shaft, and a hydraulic clutch operable to transmit motion from said driving to said driven shaft, means for supplying oil to said lubricating system and to said hydraulic clutch continuously during the operation of the engine, and means for regulating the pressure of the oil within the hydraulic clutch.

In testimony whereof, I have signed my name to this specification.

RALPH M. LOVEJOY.